May 1, 1928. Re. 16,946
B. ROSENTHAL
KEY CASE
Original Filed April 5, 1926
Fig. 1,
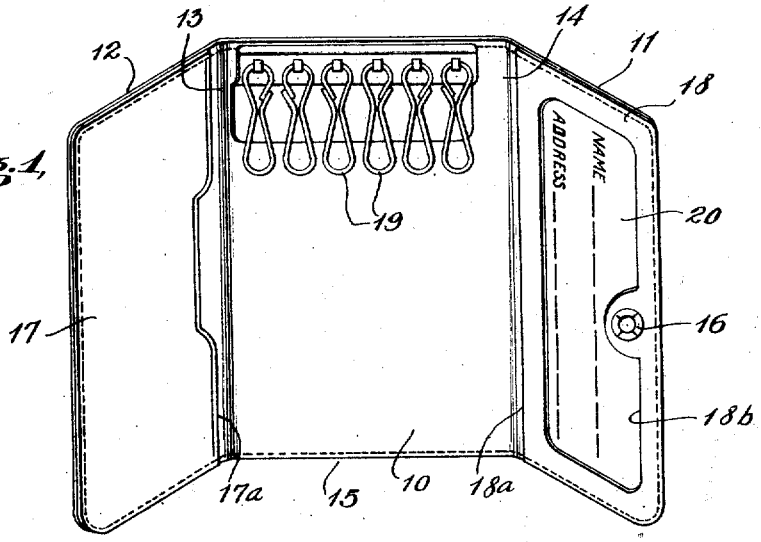
Fig. 2,
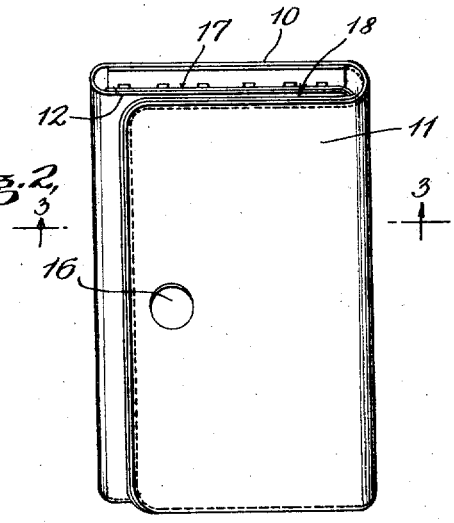
Fig. 3,
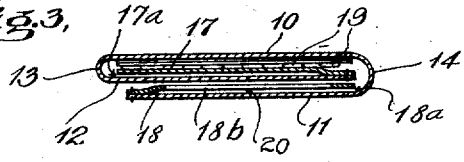
INVENTOR
BERNARD ROSENTHAL
BY Louis Barnett.
ATTORNEY Reissued May 1, 1928. Re. 16,946

UNITED STATES PATENT OFFICE.

BERNARD ROSENTHAL, OF BROOKLINE, MASSACHUSETTS.

KEY CASE.

Original No. 1,598,988, dated September 7, 1926, Serial No. 99,694, filed April 5, 1926. Application for reissue filed September 6, 1927. Serial No. 217,863.

The invention relates to cases for keys. Cases of this particular type are made up from a strip of flexible material, such as leather or the like, the end portions of which are folded in overlapping relation over the central portion to form an enclosure. The end portions, or flaps, are secured together by suitable means, such as a snap fastener, which is usually applied centrally between the upper and lower ends of the case. Such ends are open but the key holders, being pivoted to the central portion of the case, are prevented from passing out the case by the two overlapping flaps which bear down upon them. The key holders are usually mounted upon a nonflexible member which extends across the central portion of the case near its upper end and holds it in the desired flat form and the ends of this member lie approximately coincident with the lines of fold of said flaps and prevent the flaps from folding upon other lines which are closer together. At the lower end of the case there is nothing to hold the central portion of the case in flat form nor to prevent the flaps from folding along other lines which are closer together, than the usual lines of fold. Consequently if pressure is brought to bear on the sides of the case (defined by the lines of fold) and near the lower end thereof, the back or central portion of the case will bend rearwardly bringing the lines of fold of the flaps closer together at their lower ends and making them converge downwardly instead of remaining parallel. When this happens, the upper ends of the flaps are caused to separate and bulge out from the key holder supporting member, making a large opening through which some of the keys and their holders may drop out. That is, the flaps being pivotally connected intermediate their ends of the snap fastener, the inward movement of the flaps at their lower ends causes a separation of the flaps at their upper ends.

In order to overcome this difficulty one object of the invention is to provide the end portions or flaps of the case with stiffening or reenforcing members which are attached to the outside ends and terminate approximately at the lines of the fold. The reenforced flaps prevent the sides from being brought toward one another to collapse or buckle the flat folded case. The reinforcing members are so constructed as to provide in and of themselves a resistance to buckling due to pressure applied at the folded edges of the case.

Another object of the invention is to provide a reenforcing member on the end portions or flaps of the case which form pockets for the reception of coins, papers, cards or the like articles. One of the pockets is constructed to serve as an identification holder and is adapted to fold over the opposite end portion of the case so that the latter is interposed and forms a shield to prevent the identification device from being marred by coming in contact with the key holder and keys.

A further object of the invention is to provide an improved key case of the character described comprising few and simple parts forming a neat appearing rugged structure, which shall be cheap to manufacture, and practical and efficient to a high degree in use.

In my drawings:—

Fig. 1 is a perspective view of the case when open, showing the reenforced flaps.

Fig. 2 is a perspective view of the case in its folded position; and

Fig. 3 is a cross-sectional view taken on line 3—3 in Fig. 2.

The case consists of a strip 10 of a flexible material, such as leather, and the end portions 11 and 12 are adapted to be folded along the lines 13 and 14 over the central portion 15 and to be secured in overlapping relation by some suitable means, such as a snap fastener 16. To the end portions 11 and 12, I attach the reenforcing members 17 and 18 by sewing them on to the outside edges of the end portions. These reenforcing members terminate near the lines 13 and 14. From this arrangement it will be seen that the flaps are kept in their proper position and are prevented from assuming any other position.

To further utilize the flaps, the reenforcing members 17 and 18 are preferably made to form pockets with the end portions 11 and 12 for the reception of coins, papers, cards or the like objects. Said pockets have edge openings $17^a$ and $18^a$, extending adjacent the fold lines 13 and 14 respectively, the pocket formed with said member 18 being constructed with a front opening $18^b$ to serve as an identification holder 20.

As seen from the drawing in using the key case, the flap formed of the end portion 12 and the reenforcing member 17 is first folded against the key holders 19 and any keys secured thereon, and then the other flap with the identification holder 20 is folded to overlie said first mentioned flap. Thus the latter acts as an interposing shield to prevent the identification device 20 from being marred by coming in contact with said key holders and keys.

It will thus be seen that there is provided a device in which the several objects of this invention are achieved and which is well adapted to meet the conditions of practical use.

As various other possible embodiments might be made of this above mentioned, and as various changes might be made in the embodiments above set forth, it is to be understood that all matter herein set forth as shown in the accompanying drawing is to be interpreted as illustrative and not in a limiting sense.

Having described my invention, what I claim is:—

1. A case for keys and the like, comprising, a strip of flexible material having a back portion and a flap on each side thereof, said flaps being foldable in overlapping relation over said back portion, a series of holders for keys and the like supported from said back portion near the upper edge thereof, and reenforcing members substantially co-extensive in width and length with the flaps and secured thereto along their outside edges substantially for the full length and width thereof, said members arranged to maintain the case in flat form and resist pressure applied to the sides of the case along the lines of fold of said flaps.

2. A case of the character described comprising a flexible strip having end portions foldable in overlapping relation on a mid portion thereof; key retaining means mounted on said mid portion adapted to contact with an end portion, and a member co-extensive in length and width with one of said end portions and secured thereto at the edges substantially the full length and width thereof to form a reenforcing flap when folded over said mid portion for maintaining the case flat and resisting pressure applied against the folded edges of the case.

3. A case of the character described comprising a flexible strip having end portions foldable in overlapping relation on a mid portion thereof, key retaining means mounted on said mid portion adapted to contact with an end portion, and a member secured to each end portion to form a pocket structure therewith, said structures extending the length and width of said end portions, each of said members being secured to the corresponding end portion at the outside edges for the full length and width thereof to serve as a reenforcement for resisting distortion and buckling forces applied to the flat folded case.

4. A case of the character described comprising a flexible strip having end portions foldable in overlapping relation on a mid portion thereof; key retaining means mounted on said mid portion, means for releasably fastening said portions folded, and a member having an opening secured to one of said end portions and forming an identification holder therewith, said holder extending substantially over the entire side of said end portion; said holder being secured to said end portion at the outside edges for the full length and width thereof to serve as a reenforcement for resisting distortion and buckling forces applied to the flat folded case, said fastening means retaining the identification holder against the other of said end portions out of contact with key retaining means to prevent marring of said holder.

5. A case of the character described comprising a flexible strip having end portions foldable in overlapping relation on a mid portion thereof, key retaining means mounted on said mid portion, means for releasably fastening said portions folded, and a member secured to each end portion and forming a pocket structure therewith, said structures extending substantially over one entire side of each end portion, each of said members being secured to the corresponding end portion at the outside edges for the full length and width thereof, to serve as a reenforcement for resisting distortion and buckling forces applied to the flat folded case, one of said members having an opening to form an identification holder, said fastening means retaining the pocket structure formed by the other of said members interposed between said holder and key retaining means to prevent the holder from being marred by contacting with the key retaining means.

In testimony thereof, I affix my signature.

BERNARD ROSENTHAL.